H. S. DUNNING & W. G. HOUSKEEPER.
MEANS FOR PHOTOMETERING ELECTRIC LAMPS.
APPLICATION FILED MAY 16, 1910.

1,057,415.

Patented Apr. 1, 1913.

6 SHEETS—SHEET 1.

WITNESSES:
C. L. Belcher
Otto S. Schairer

INVENTORS
Herbert S. Dunning
& William G. Houskeeper
BY
Philip S. Carr
ATTORNEY

H. S. DUNNING & W. G. HOUSKEEPER.
MEANS FOR PHOTOMETERING ELECTRIC LAMPS.
APPLICATION FILED MAY 16, 1910.

1,057,415.

Patented Apr. 1, 1913.

6 SHEETS—SHEET 3.

SCALE FOR 100 WATT 80 C.P., 1.25 W.P.C. TUNGSTEN LAMP
CURVES FOR TRUE W.P.C. AT 80 C.P. AND VOLTS AT 1.25 W.P.C.

WITNESSES:
C. L. Belcher
Otto S. Schairer

INVENTORS
Herbert S. Dunning
+ William G. Houskeeper
BY
Shirley E. Barr
ATTORNEY

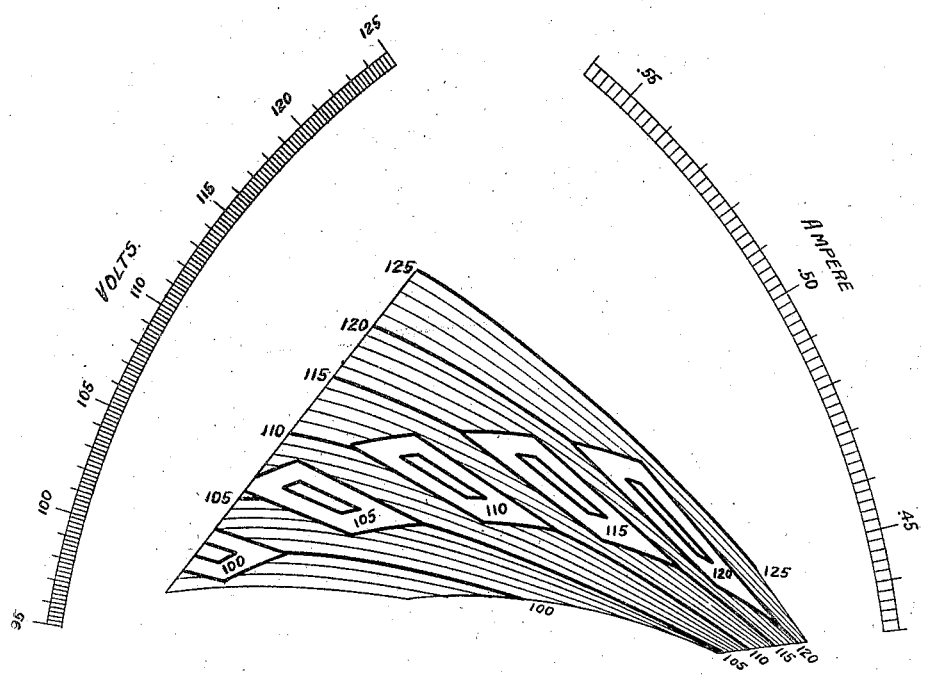

# UNITED STATES PATENT OFFICE.

HERBERT S. DUNNING, OF NEW DORP, NEW YORK, AND WILLIAM G. HOUSKEEPER, OF PHILADELPHIA, PENNSYLVANIA, ASSIGNORS TO WESTINGHOUSE LAMP COMPANY, A CORPORATION OF PENNSYLVANIA.

MEANS FOR PHOTOMETERING ELECTRIC LAMPS.

1,057,415.　　　Specification of Letters Patent.　　Patented Apr. 1, 1913.

Application filed May 16, 1910. Serial No. 561,735.

*To all whom it may concern:*

Be it known that we, HERBERT S. DUNNING and WILLIAM G. HOUSKEEPER, citizens of the United States, and residents, respectively, of New Dorp, Staten Island, in the county of Richmond and State of New York, and of Philadelphia, in the county of Philadelphia and State of Pennsylvania, have invented a new and useful Improvement in Means for Photometering Electric Lamps, of which the following is a specification.

Our invention relates to methods of and means for photometering or determining the ratings of incandescent lamps, and it has for its object to provide a method and means for such purpose which shall be simple and effective in operation and capable of giving direct indications of certain of the electrical values or characteristics of lamps which it has heretofore been possible to obtain or determine only indirectly or by laborious computations.

Figure 1:
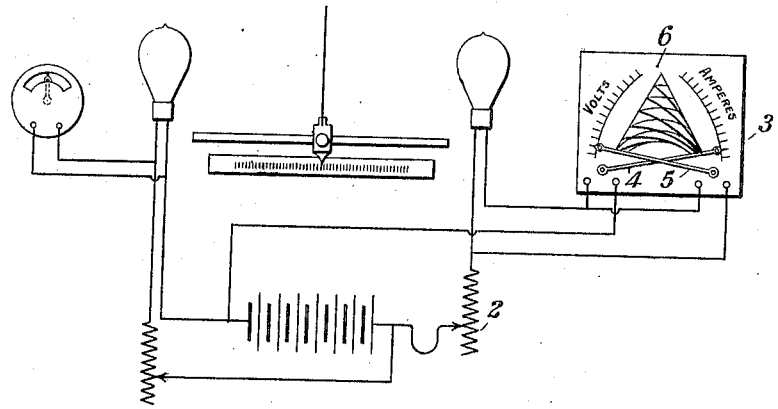
Figure 3:
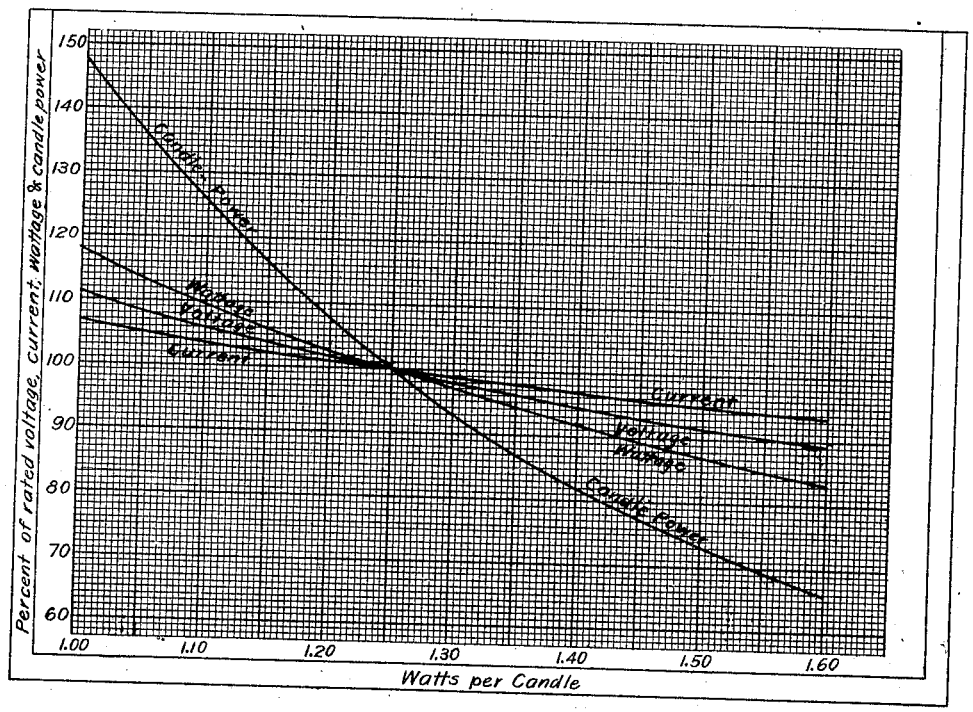
Figure 2:
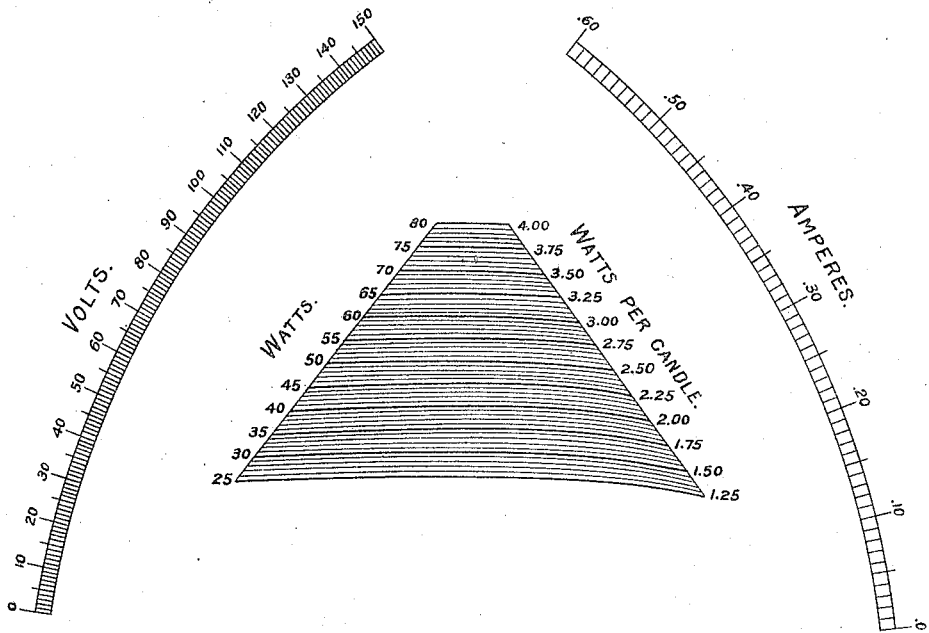
Figure 4:
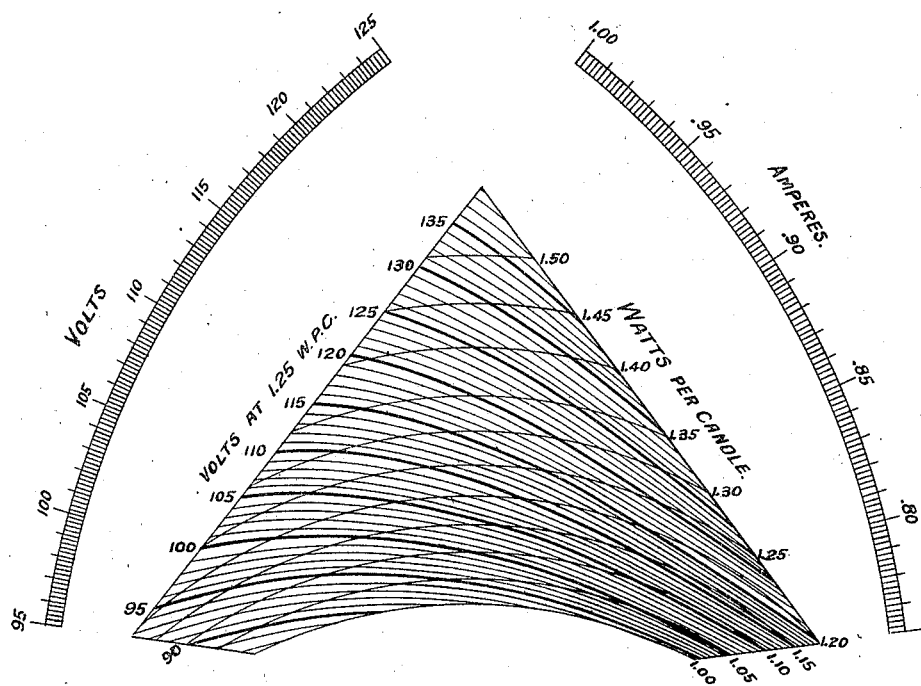
Figure 5:
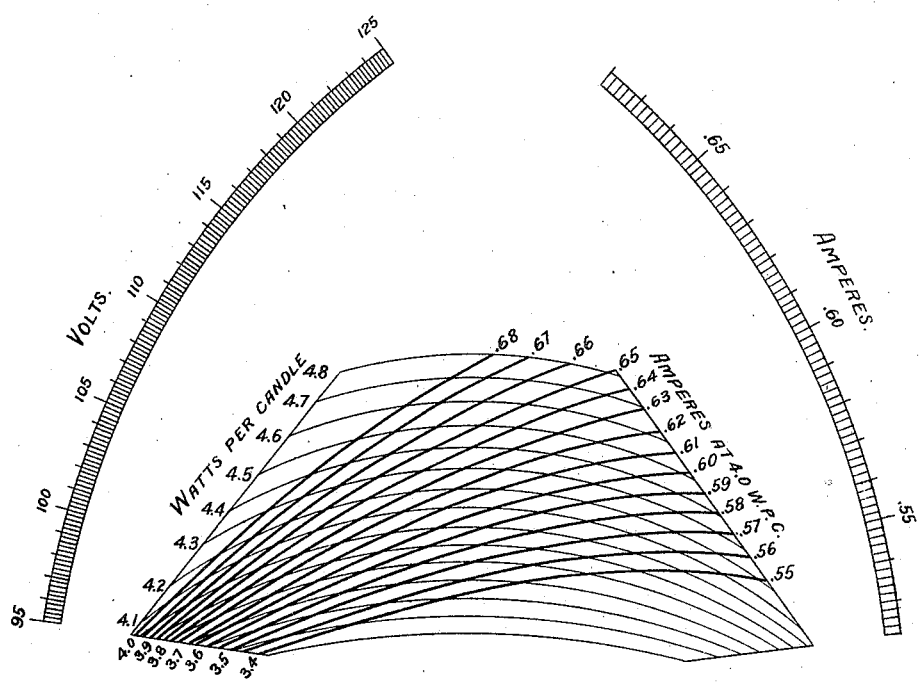
Figure 6:
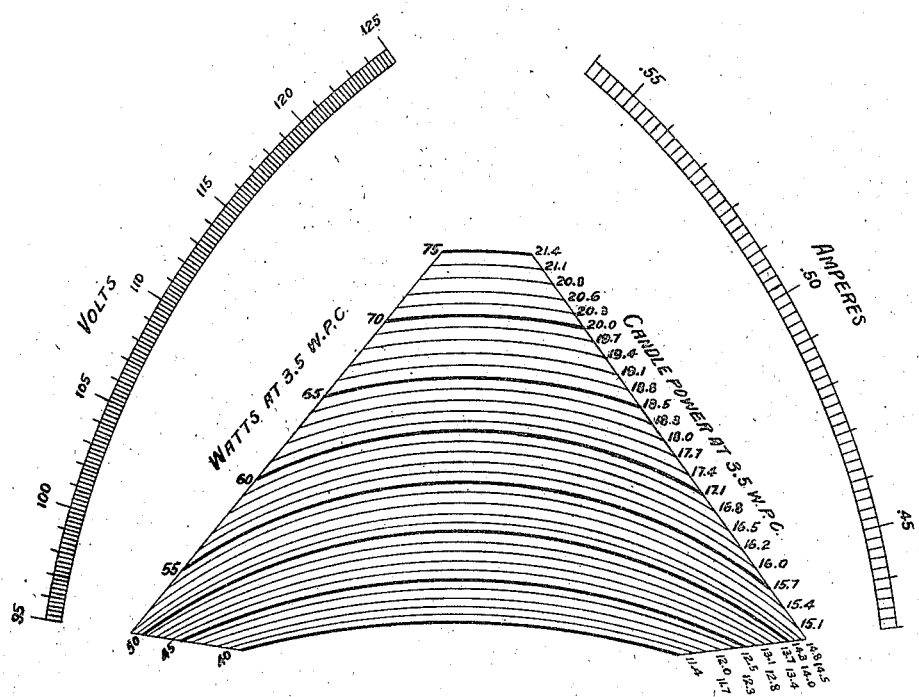

The invention consists in obtaining direct and independent indications of the voltage and current of a lamp at a given candle power, and in combining the said indications to obtain a direct indication of certain values or characteristics of the lamp upon a chart, especially prepared for the purpose, and having lines or a calibration determined by the characteristic curves of lamps of the kind under test. In the measurement of the voltage and current of the lamp under test, an instrument which is similar, in construction, to that disclosed in Patent No. 791,785 may be employed, the chart upon the dial plate being provided with calibration lines which are determined from the characteristic curves of lamps of the kind under test and are adapted to give the information particularly desired with reference to the lamp under test. By the use of the proper chart in connection with the said instrument, it is possible to obtain a direct indication of the amperes actually consumed by a lamp under test, the actual voltage between its terminals, the actual number of watts it consumes, the actual number of watts consumed per candle power of light, the voltage at which the lamp will operate at any desired efficiency, when measured in watts consumed per candle power of light, the current required by the lamp, under operation at any desired efficiency, when measured in the watts consumed per candle power of light, the candle power which the lamp will give, under operation at any desired efficiency, when measured in watts consumed per candle power of light, or the total number of watts which a lamp will consume, under operation at any desired efficiency, when measured in watts per candle power of light. The dials may also be so arranged that several of these items of information may be obtained from a single instrument. The manner in which these values may be obtained will be explained in connection with the accompanying drawings, Figure 1 of which is a diagrammatic view of the complete apparatus for practising the invention. Fig. 2 is a chart for an instrument which is adapted to give direct indications of the total number of watts actually consumed by the lamp under test, and of its actual measured efficiency in watts consumed per candle power of light. Fig. 3 represents the characteristic curves of an incandescent lamp which was used in determining the calibration of the charts of Fig. 4, and which is useful in explaining the same. Fig. 4 represents the dial plate of an instrument by means of which direct indications may be obtained of the voltage at which a lamp will operate at a given efficiency, when measured in watts consumed per candle power of light, irrespective of the voltage and efficiency at which the lamp operates during the test. It also permits of obtaining a direct indication of the efficiency at which a lamp operates during the test. Fig. 5 represents the dial plate of an instrument by means of which a direct indication may be obtained of the efficiency at which a lamp operates during the test, and, also, whereby a direct indication may be obtained of the current required by the lamp in order to cause it to operate at a desired or given efficiency. Fig. 6 represents the dial plate of an instrument whereby a direct indication may be obtained of the total number of watts that will be consumed by a lamp, and also of its candle power, when operated at a given efficiency measured in watts consumed per candle power of light. Fig. 7 represents the dial plate of an instrument whereby a direct indication may be obtained as to whether or not a lamp, when operated at certain voltages, will consume within certain percentages of a given number of watts or give within certain percentages of a designated candle power.

In practising the invention, the lamp to be tested is operated constantly at a given candle power by properly regulating its voltage and current, as by means of a rheostat 2, and the voltage and current of the lamp are measured by means of an instrument 3 constructed similarly to that set forth in the above-mentioned Patent No. 791,785, the said instrument comprising independent voltmeter and ammeter movements and corresponding independent pointers 4 and 5 that move in parallel planes and in intersecting paths over a common dial plate 6. The dial plate is provided with volt and ampere scales, respectively, beneath the free extremities of the voltmeter and ammeter pointers. Between the volt and ampere scales is a triangular chart that is calibrated in accordance with the purpose for which the instrument is employed and with the kind of lamps to be tested. The dial plate represented by Fig. 2 is adapted to be used in an instrument employed for making measurements upon metallized carbon-filament lamps having a nominal rating of twenty candle power and an efficiency of two and one-half watts per candle power. By means of this chart, as before stated, the total number of watts actually consumed by a lamp, while being tested, may be directly determined, and also the actual efficiency of the lamp, as operated during the test, when measured in the number of watts consumed thereby per candle power of its light. These indications are made upon the chart at the intersection of the voltmeter and ammeter pointers, and, at the extremities of the pointers, the voltage and current of the lamp are also indicated. The calibration of the chart, for the total number of watts consumed by the lamp, is obtained or determined by multiplying together the voltage and current indications at the extremities of the instrument pointers for any given measurement, and locating the corresponding wattage value upon the chart directly beneath the intersection of the pointers. Since the lamp under test is constantly maintained at twenty candle power, the efficiency of the lamp, when measured in watts consumed per candle power of light, may be determined by dividing the total number of watts consumed by twenty. Thus, the line upon the chart which represents a total wattage of eighty also represents an efficiency of four watts per candle power. From this brief description, the manner in which all of the lines or points upon the triangular chart are determined becomes obvious.

The curves of Fig. 3 were obtained by actual measurement from lamps and by computations from such measurements, and they respectively represent the percentage of variation of the voltage, current, wattage and candle power of a tungsten filament lamp, having a nominal rating of one hundred watts, eighty candle power and an efficiency of 1.25 watts per candle, with variations in the number of watts consumed by the lamp per candle power of its light. These curves provide means for readily determining the percentage of change which must be effected in the voltage, current, wattage or candle power of a lamp, when operating at a given efficiency, as measured in watts consumed per candle power of light, in order to cause the same to operate at any other desired efficiency, as measured in watts consumed per candle power of light. These curves were employed in determining the calibration of the chart upon the dial plate of Fig. 4, which is adapted to be employed in making measurements upon lamps of the kind of which Fig. 3 represents the characteristic curves. Curves similar to those of Fig. 3 were also employed in the calibration of the charts upon the dial plates of Figs. 5, 6 and 7.

The dial plate represented by Fig. 4 is intended for use in instruments adapted to make measurements upon tungsten-filament lamps having a nominal rating of one hundred watts, eighty candle power and an efficiency of 1.25 watts per candle power, and the manner in which the chart upon the said dial plate was determined will now be given. The approximately horizontal circular lines or arcs, which represent the efficiency of a lamp under test, in watts consumed per candle power of light, are determined by multiplying together the voltage and current indications at the extremities of the voltmeter and ammeter pointers for any given positions thereof, and dividing this product by eighty, which is not only the nominal candle power of the lamp under test but that at which it is actually maintained during the test. This quotient gives one value of the watts consumed per candle power, and a point corresponding to this value is applied to the chart directly beneath the intersection of the voltmeter and ammeter pointers. In this manner, a large number of points upon the chart are determined and curves are drawn through such points as represent the same values.

A specific example of the manner of locating a single point upon the lines upon the chart that represents the voltages at which lamps will consume 1.25 watts per candle power will fully explain the manner in which all of the said lines are determined. If the voltage of the lamp under test is 112.8 and its current .922 of an ampere, the actual number of watts consumed by the lamp is 104. The efficiency of the lamp is 104 divided by 80, or 1.3 watts per candle power. Referring now to the voltage curve of Fig. 3, it will be found that the voltage of a lamp of the particular kind under test, when operating at 1.3 watts per candle power, is approximately 98% of the voltage at which the lamp will operate at an efficiency of 1.25 watts per candle power. Dividing 112.8 by .98, it is found that, if the lamp is operated at a voltage of 115, it will give an efficiency of 1.25 watts per candle power. It will now be noted that the voltmeter and ammeter pointers, when respectively indicating 112.8 volts and .922 amperes, intersect upon the arc representing 1.3 watts per candle power, and that said intersection occurs upon the line representing 115 volts, which is the same as the above calculated voltage of 115. The meaning of this is that, if 115 volts are applied to the lamp, it will give an efficiency of 1.25 watts per candle power. Many points upon the chart were located in this manner, and curves were drawn through the points representing the same values. Thus, by the use of an instrument having a dial plate like that shown in Fig. 4, the voltage, current and efficiency of the lamp under test at its nominal candle power may be readily determined, as well as the voltage at which the lamp will give an efficiency of 1.25 watts per candle power. This information has heretofore been derived only by a series of computations similar to that resorted to in determining the location of a single point upon the chart of the dial plate of Fig. 4, and, since it is often highly desirable that lamps should be rated and marked with the voltage at which they will give a certain efficiency, the utility of the present instrument is readily apparent, because it gives direct indications of values which could heretofore be arrived at only indirectly and by computation.

The dial plate of Fig. 5 is that of an instrument adapted for use in connection with carbon-filament lamps having a nominal rating of 64 watts, 16 candle power and an efficiency of 4 watts per candle power. The calibration of the chart upon the dial plate was determined in a manner similar to that described for the chart of Fig. 4, by using the characteristic current curve, instead of the characteristic voltage curve, of carbon lamps of the kind under test, the characteristic current curve being similar to that of Fig. 3. Of course, when this dial plate is employed, lamps are usually of the series type, as it is with this type of lamp that it is desirable to know the current value at which the lamp will have an efficiency of a given number of watts per candle power, in order that the same may be marked upon the lamps.

It often becomes desirable to know not only the voltage or current at which a lamp will have a given efficiency, irrespective of the measured voltage and current when the lamp is operating at its nominal candle power, but also the total number of watts which the lamp will consume and its candle power at a given efficiency. The chart upon the dial plate of Fig. 6 is adapted to give such additional information, this dial plate being intended for use in instruments employed in making measurements upon carbon-filament lamps having a nominal rating of 56 watts, 16 candle power and an efficiency of 3.5 watts per candle power. In order to determine the location of any particular point upon this chart, the voltage and current indications, respectively, at the extremities of the voltmeter and ammeter pointers are first multiplied together and the product divided by 16, which is the nominal candle power of the lamp and also that at which it is maintained during the test. This quotient represents the efficiency of the lamp at 16 candle power, and, then, by referring to the characteristic watt and candle power curves (similar to those of Fig. 3) of lamps of the same kind as that under test, the percentage of change in the wattage and candle power, in order to cause the lamp to operate at an efficiency of 3.5 watts per candle power, can be readily determined. A point corresponding to the value thus determined is placed upon the chart directly beneath the intersection of the instrument pointers, and a large number of the points are determined in the same manner, after which curves are drawn through points representing the same values. Thus, in order to determine the candle power of a lamp and the number of watts it will consume when operating at an efficiency of 3.5 watts per candle power, it is only necessary to maintain the lamp at 16 candle power and note upon the chart the point of intersection of the voltmeter and ammeter pointers.

In rating or photometering lamps, it is often desirable to select from a batch of lamps those that vary only within a definite percentage from a given wattage and candle power, at a certain voltage, and an instrument having a dial plate like that of Fig. 7 provides a ready means for making such selections. The dial plate is adapted for use in instruments employed to make measurements upon carbon-filament lamps having a nominal rating of 56 watts, 16 candle power and an efficiency of 3.5 watts per candle power. The chart upon this dial is provided with lines representing voltages at which the lamps will operate at an efficiency of 3.5 watts per candle power. It is also provided with several sets of concentric polygons bearing certain voltage designations. The inner polygon, having any particular voltage designation, is of such size and shape, that, if the instrument pointers intersect above it, when the lamp is maintained at 16 candle power, the lamp will consume within 2½% of 56 watts and will give within 2½% of 16 candle power when the lamp is operated at the voltage by which the polygon is designated. If the intersection of the pointers occurs over the larger polygon of any particular voltage designation, the lamp will consume within 7½% of 56 watts and will give within 7½% of 16 candle power when the voltage corresponding to that by which the polygon is designated is applied to the lamp. If the intersection of the instrument pointers occurs outside of the polygons, the point of intersection will occur upon some one of the lines designating the voltage at which the lamp will give an efficiency of 3½ watts per candle power, and the lamp may then be marked with such voltage and efficiency. Thus, this chart provides means for making a ready selection of lamps which will operate within certain specified limits and also for properly rating such lamps as do not come within the designated limits.

While many modifications of the invention have been illustrated and described, it will be understood that the invention is not limited to such specific applications but that it is susceptible of use under other conditions and for other purposes, the essential feature of the invention consisting in providing the dial plate of the instrument with a chart or calibration that is determined both by the actual measurements taken during the test and by the known characteristics of the lamps or other devices under test.

We claim as our invention:

1. The combination with a photometer for electric lamps, of a measuring instrument associated with the lamps and having a plurality of independent indicating members that are movable in intersecting paths, and a chart upon which the said members effect a combined indication, the said chart being provided with marks representing values determined by the characteristics of lamps of a certain kind.

2. The combination with a photometer for electric lamps, of an ammeter and a voltmeter having indicating devices movable in intersecting paths, and a scale or chart provided with lines or other marks representing one or more electrical values at which lamps of a certain kind will consume a given number of watts.

3. The combination with a photometer for electric lamps, of an ammeter and a voltmeter having indicating devices movable in intersecting paths, and a scale or chart provided with lines or other marks representing one or more electrical values at which lamps of a certain kind will consume a given number of watts per candle power.

4. The combination with a photometer for electric lamps, of an ammeter and a voltmeter having indicating devices movable in intersecting paths, and a scale or chart provided with lines or other marks representing amperes at which lamps of a certain kind will consume a given number of watts per candle power.

5. The combination with a photometer for electric lamps, of an ammeter and a voltmeter having indicating devices movable in intersecting paths, and a scale or chart provided with lines or other marks representing values at which lamps of a certain kind will consume a given number of watts per candle power.

6. The combination with a photometer for electric lamps, of an ammeter and a voltmeter having indicating devices movable in intersecting paths, and a scale or chart provided with lines or other marks representing the numbers of watts consumed per candle power by the lamps being photometered.

In testimony whereof, we have hereunto subscribed our names this 2nd day of May, 1910.

H. S. DUNNING.
WILLIAM G. HOUSKEEPER.

Witnesses:
  CHARLES E. KELLY,
  C. W. YOUNGHOLM.